June 13, 1944.                M. B. McLAUTHLIN                2,351,060
                                HOISTING MACHINE
                             Filed Nov. 12, 1940          3 Sheets-Sheet 3

INVENTOR.
                                                Martin B. McLauthlin
                                            BY  Arthur F. Randall, Atty.

Patented June 13, 1944

2,351,060

UNITED STATES PATENT OFFICE 2,351,060

HOISTING MACHINE

Martin B. McLauthlin, Malden, Mass.

Application November 12, 1940, Serial No. 365,390

1 Claim. (Cl. 74—425)

This invention relates to hoisting machines for elevators and the like and it has for its object to improve the construction of machines of this class.

It is also an object of this invention to provide an improved self-contained hoisting machine unit which will occupy a minimum amount of space and wherein the parts are particularly constructed and arranged to provide for ready access to certain inclosed parts which periodically require attention.

To these ends I have provided an improved hoisting machine unit of the class described which, in its preferred form, may be constructed and organized as set forth in the following description, the novel features of the invention being particularly pointed out and defined in the claim at the close of said description.

Figure 1:
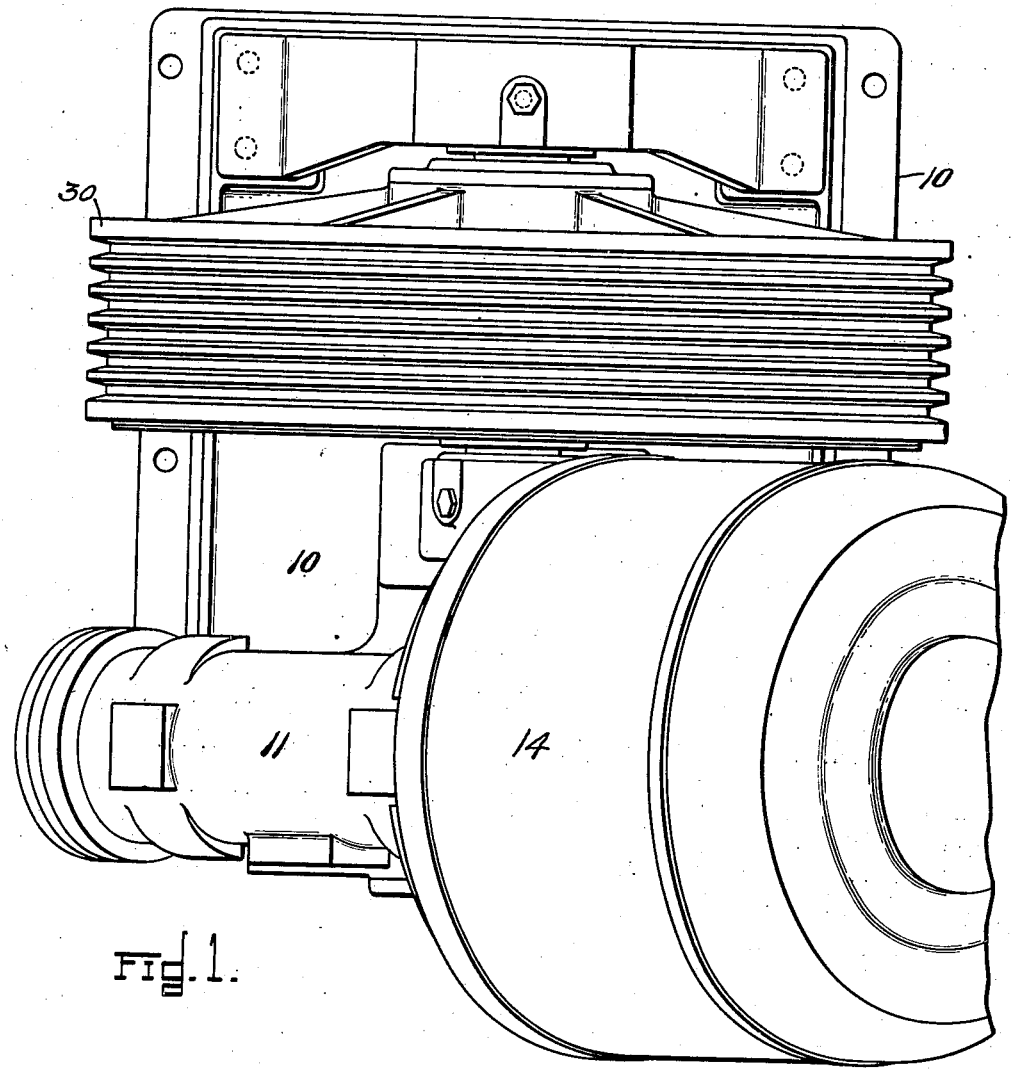
Figure 1 is a plan view of a hoisting machine unit constructed in accordance with this invention.

The illustrated embodiment of the invention is a self-contained unit comprising a frame including a base 10 made upon its top side with an upstanding hollow extension 11 inclosing a worm 12 and worm gear 13 and also serving as a support for an electric motor 14 whose armature shaft carries the worm 12.

Figure 2:
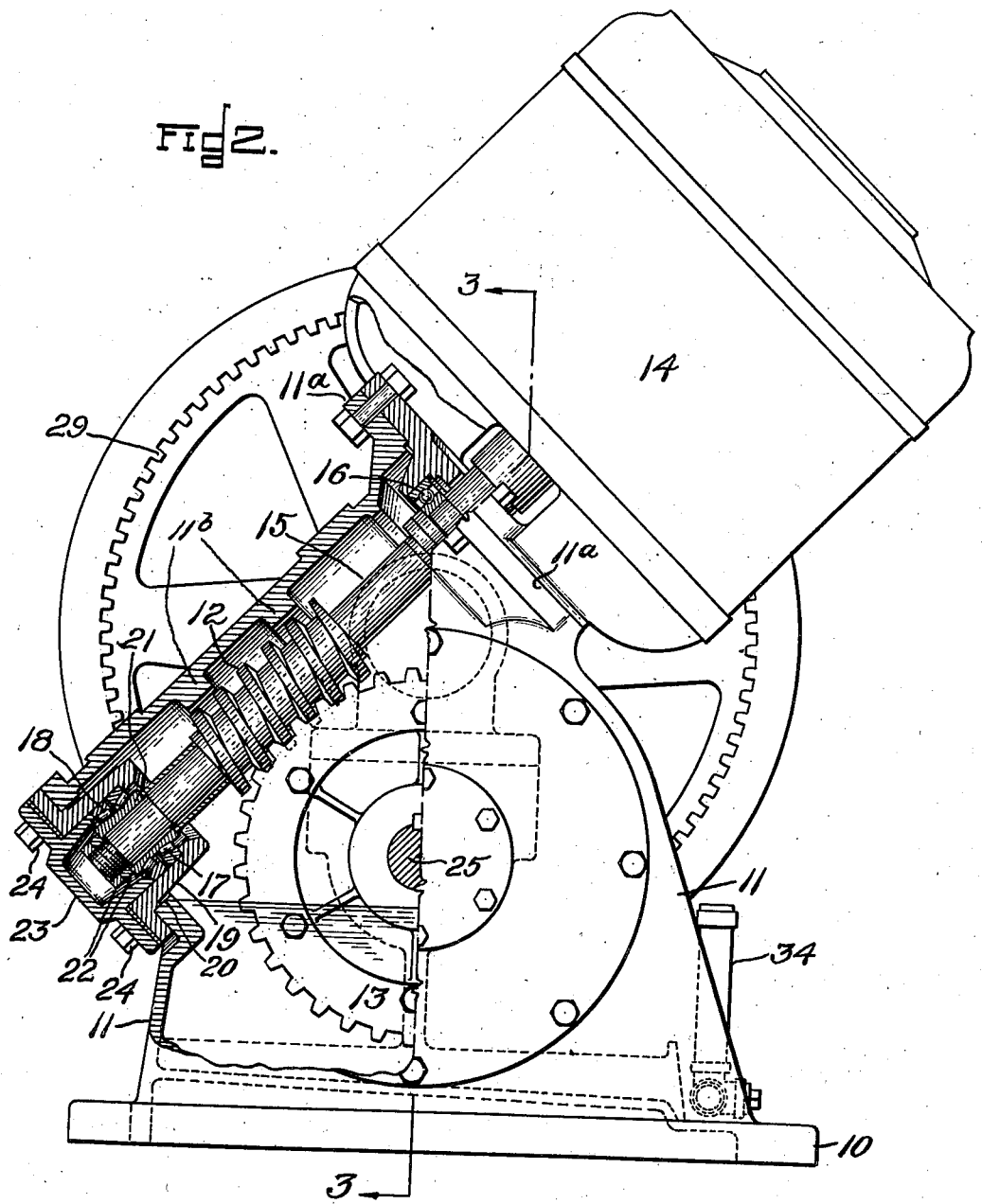
Figure 2 is a side elevation, partly in section, of the machine shown in Fig. 1.
Figure 3:
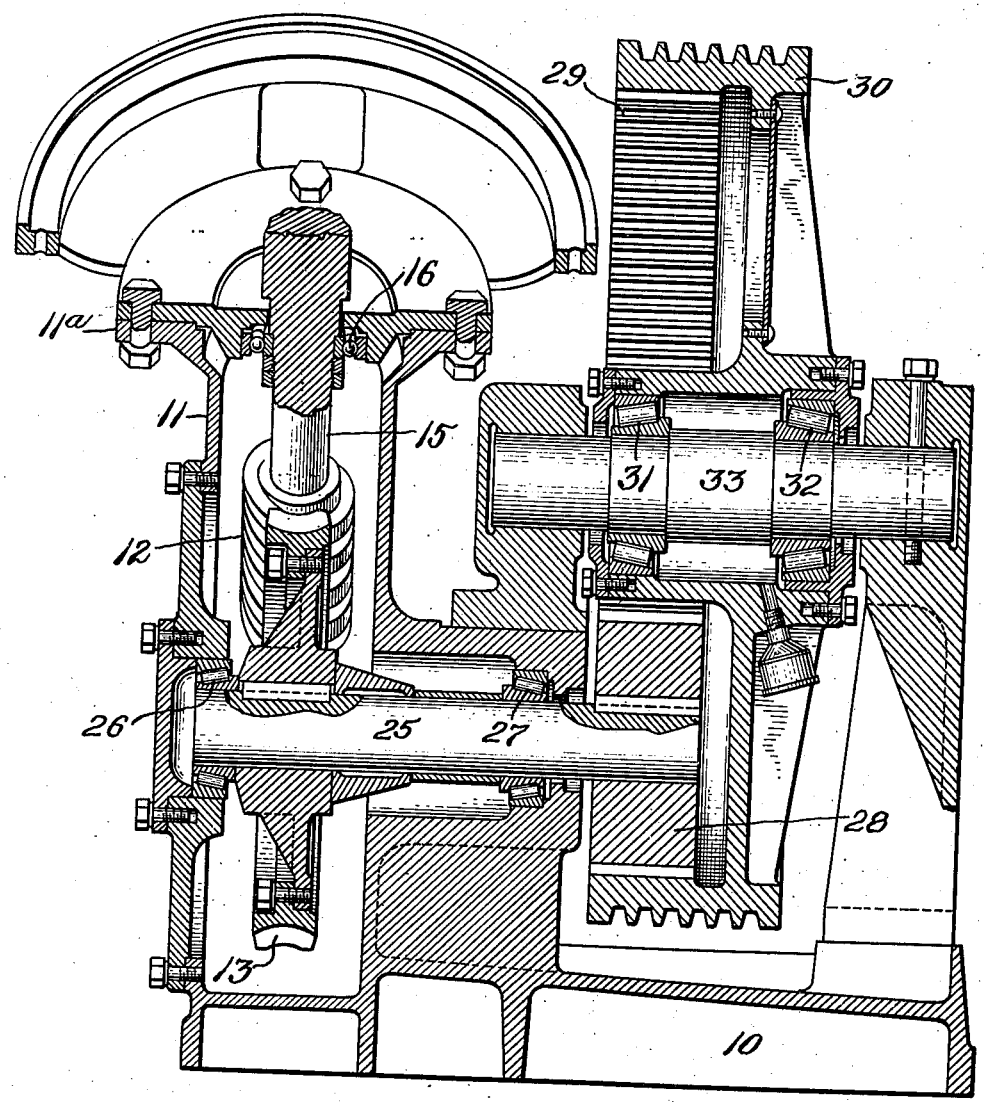
Figure 3 is a section on line 3—3 of Fig. 2.

The frame of motor 14 is bolted in position upon an obliquely disposed seat 11ª provided at the top of extension 11 directly above worm gear 13, and the armature shaft 15 of the motor extends obliquely downwardly therefrom into the housing extension 11 so that its axis is disposed at an acute angle relatively to a vertical line intersecting both the axis of gear 13 and the axis of said shaft as viewed in Fig. 2.

Armature shaft 15 is supported adjacent to the frame of the motor by a radial ball bearing 16, while the lower end of said shaft is rotatably supported by two opposed roller thrust bearings 17 and 18 which hold the shaft against endwise displacement in either direction.

The outer rings of the bearings 17 and 18 are fitted within a flanged journal box 19 occupying a port or aperture 20 provided through a wall of extension 11. A single inner ring or sleeve 21 serves for both bearings, said sleeve or ring being fastened in position on shaft 15 by nuts 22.

The outer end of box 19 is closed by a flanged cap or closure member 23 and the flanges of said member, and of journal box 19, are fastened together and to the wall of extension 11 by means of removable screws 24 extending through registering apertures provided in said flanges into tapped holes provided in said wall.

The journal box unit 19 is disposed a substantial distance above the base 10 of the frame of the machine and occupies an exposed position at one side of the housing extension 11 so that it is conveniently accessible at all times and this is a distinct advantage in a machine of this type when the bearings 17 and 18 require attention, as frequently happens.

Another important advantage derived through the oblique disposition of the armature shaft 15 and the location of the frame of the motor at the upper end thereof, is that both the height and width of the space required for accommodation of the hoisting unit, as viewed in Fig. 2, is reduced to a minimum which is substantially less than that heretofore required.

The worm gear 13 is keyed to one end of a countershaft 25 rotatably supported by opposed roller thrust bearings 26 and 27 provided within housing extension 11. Keyed to the opposite end of counter-shaft 25 is a spur pinion 28 meshing with an internal gear 29 provided upon the interior of the rim of the usual cable drum 30. This drum is rotatably supported by opposed roller thrust bearings 31 and 32 whose inner rings are mounted upon an arbor 33 fixedly supported at its opposite ends in sockets provided upon the frame of the machine.

The interior of housing extension 11 provides a receptacle for a body of lubricating oil which is introduced through a filler pipe 34.

The brake mechanism which is ordinarily mounted upon the top of motor 14 is omitted from the drawings. The circuit of motor 14 and the operating devices therefor are also omitted from the drawings but may be as usual.

It is a feature of the above described construction that because of the oblique disposition of shaft 15 the worm 12 is disposed above the level of the oil within extension housing 11 which is a distinct advantage when a high speed motor 14 is employed. Heretofore shaft 15 has been disposed vertically alongside of worm gear 13 with the result that the worm 12 was submerged in the oil and, when running at high speed, would pump or throw the latter upwardly necessitating the provision of a stuffing box between the worm and the motor 14. This stuffing box required that the armature shaft be made in two parts connected by a coupling. The present invention disposes the worm above the level of the oil within the housing extension thereby avoiding the objectionable pumping action referred to, dispensing with the stuffing box and coupling, and permitting the armature shaft to be made in one piece.

Closely adjacent to the worm 12 the interior of the housing extension 11 is made with segmental ribs or baffles 11b so that any oil thrown against the interior of the housing extension will be directed back on to the worm by said ribs or baffles.

What I claim is:

A hoisting machine of the class described comprising a frame including a supporting base made with an upstanding housing extension adapted to hold a fluid lubricant and having at its top an aperture surrounded by an inclined motor-seat; a horizontal countershaft journaled on said frame and having a portion thereof disposed within said housing extension; a worm gear fast on said portion and disposed within said housing extension directly below said seat with its lower portion submerged in said lubricant; an electric motor mounted on said inclined seat directly above said worm gear with its armature shaft extending obliquely downwardly through said aperture at an acute angle away from a vertical line intersecting the axis of said worm gear and provided with a worm meshing with the top portion of said worm gear; a journal-box unit provided interiorly with opposed thrust bearings for rotatably supporting the lower end of said armature shaft and for holding the latter against endwise displacement in either direction, said journal-box unit being closed at its outer end, and means removably fastening said journal-box unit within an aperture provided in a side wall of said housing extension with its inner end above the level of the lubricant contained within the latter and with its outer end a substantial distance above the base of said frame so that said journal-box unit occupies an exposed position at one side of said extension where it is accessible for removal and installation, said worm gear operating to transfer lubricant to said worm from which it flows downwardly under the influence of gravity along said armature shaft to said opposed thrust bearings.

MARTIN B. McLAUTHLIN.